F. P. BROOKS.
POULTRY CRATE.
APPLICATION FILED APR. 1, 1922.
1,432,960.
Patented Oct. 24, 1922.
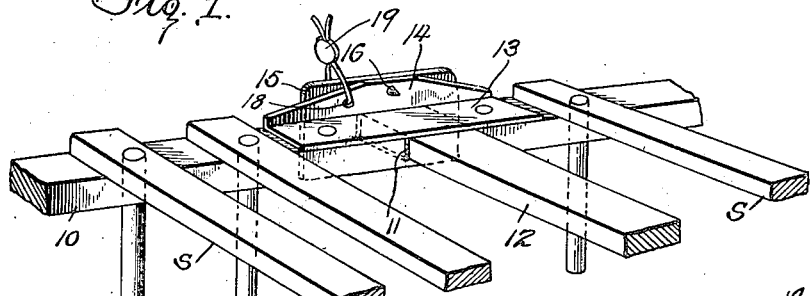
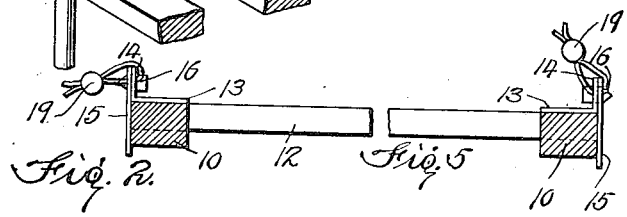
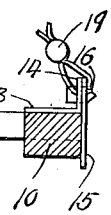
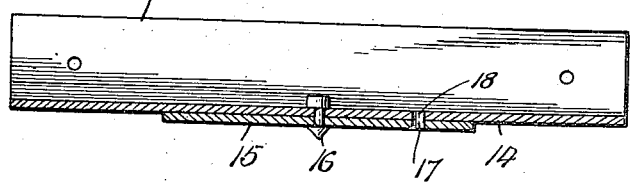
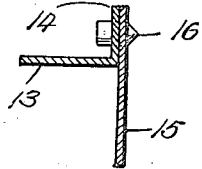
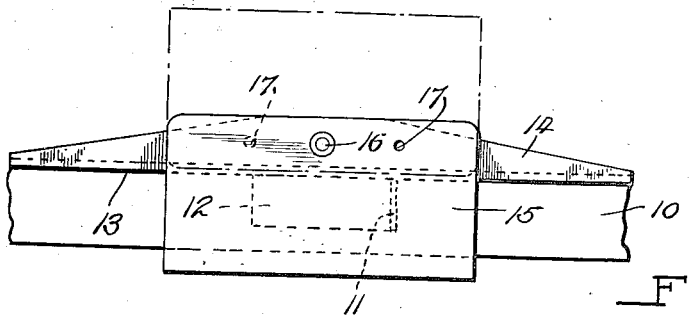
Inventor:
F. P. Brooks
Watson E. Coleman
Attorney.

Patented Oct. 24, 1922.

1,432,960

UNITED STATES PATENT OFFICE.

FRANK P. BROOKS, OF CLAY, KENTUCKY.

POULTRY CRATE.

Application filed April 1, 1922. Serial No. 548,675.

*To all whom it may concern:*

Be it known that I, FRANK P. BROOKS, a citizen of the United States, residing at Clay, in the county of Webster and State of Kentucky, have invented certain new and useful Improvements in Poultry Crates, of which the following is a specification, reference being had to the accompanying drawings.

This invention relates to poultry crates and more particularly to a securing means for the removable slats thereof.

An important object of the invention is to provide a device of this character whereby the removable slat of the poultry crate may be attached to the crate without the use of nails and the like.

A further object of the invention is to provide a device of this character by means of which the removable slat may be sealed in position when so desired, as during shipment of fowls from one point to another.

A still further object of the invention is to provide a device of this character which is very simple in construction, which may be readily employed to replace the present fastening means and which, when so employed, will simplify the insertion and removal of the removable slat as well as operate to maintain the same in closed position when in transit.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a perspective view showing a removable slat fastener constructed in accordance with my invention applied to a coop;

Figure 2 is a sectional view taken through the fastener;

Figure 3 is a side elevation showing the same applied to a coop;

Figure 4 is a vertical sectional view taken therethrough and

Figure 5 is a sectional view showing the application of the fasteners to each end of the removable slat.

Referring now more particularly to the drawings, the numeral 10 indicates spaced side bars of a crate to which the slats S thereof are attached. These side bars are provided with aligned notches 11 and a removable slat 12 has its ends resting upon the base of these notches.

The numeral 13 designates plates having their ends secured to the upper walls of the side bars 10 at the edges of the slots 11 and extending over these slots to prevent vertical movement of the removable slat 12. Each plate 13 is provided upon the outer edge thereof which is substantially coincident with the outer edge of the side bars 10 with an upstanding flange 14. The numeral 15 designates plates, preferably rectangular in form and pivoted adjacent their upper edges to the flanges 14, as at 16, at a point above the approximate center of the notches 11. The pivot pin 16 extends through the plate at the central portion of the upper portion thereof so that the plate is balanced thereon and normally has its lower edge portion extending across and closing the end of the opening formed by the recess or notch 11 and the plate 13 and accordingly prevents removal of the slat 12 endwise through this opening. The plates, however, when reversed from the position shown in Figure 3 in solid lines to the position shown in dotted lines uncover the opening permitting the removal of the slat. It will be seen that tilting the crate or even standing the same upon end will not destroy the locking of the plates 15 since the plates will extend across the opening sufficiently in any position except the position shown in dotted lines in Figure 3 to permit removal of the slat.

In order to prevent unauthorized removal of the slat during transportation of the crate I provide in each of the plates 15 an opening 17 and in the flanges of the plates 13 openings 18 with which the openings 17 of the plates 15 align when the plates are in the normal position or in that position in which they fully cover the end of the opening formed by the plate 13 and the notch 11. Through these openings when aligned the seal wire of a seal 19 may be directed to secure the plate against movement. Attention is directed to the fact that the plate 15 is of greater width and length than the opening thus formed and is mounted upon the pivot 16 at a point spaced from its edge a distance approximately equal to the distance from the pivot 16 to the edge of the opening.

From the foregoing it is believed to be obvious that a crate in which the removable slat is locked in accordance with my invention is particularly well adapted for use in that the same may be readily sealed during shipment and that the plates during return of the empty crates will effectually prevent loss of the removable slats without the necessity of nailing the same into position which has a tendency to destroy not only the slats themselves but the side bars to which the slats are secured. It will furthermore be obvious that the construction as hereinbefore set forth is capable of some change and modification without materially departing from the spirit of my invention and I accordingly do not limit myself thereto except as hereinafter claimed.

I claim:

1. In a coop, side bars, one of which is notched, a slidable slat having one end mounted in the other of the side bars and held against longitudinal movement in one direction, a plate bridging the notch of the first named side bar and provided with a flange, and a latch pivoted to the flange and preventing movement of the slat in the opposite direction.

2. In a coop, side bars, one of which is notched, a slidable slat having one end mounted in the other of the side bars and held against longitudinal movement in one direction, a plate bridging the notch of the first named side bar and provided with a flange, and a latch pivoted to the flange and preventing movement of the slat in the opposite direction, said latch being provided with an opening adapted for the reception of a seal wire.

3. In a coop, side bars, one of which is notched, a slidable slat having one end mounted in the other of the side bars and held against longitudinal movement in one direction, a plate bridging the notch of the first named side bar and provided with a flange, and a latch pivoted to the flange and preventing movement of the slat in the opposite direction, comprising a plate obstructing the opening formed by the combination of the first named plate with the notch of the side bar when in all positions but one.

4. A latch for the slidable slats of poultry crates comprising a plate adapted for attachment to the crate and embodying a flange, and a rectangular plate pivotally connected to the first named plate and swinging in the path of the slidable slat when the crate is in any position but one.

5. In a coop, side bars, one of which is notched, a slidable slat having one end mounted in the other of the side bars and held against longitudinal movement in one direction, a plate bridging the notch of the first named side bar and provided with a flange, a latch pivoted to the flange and preventing movement of the slat in the opposite direction comprising a rectangular plate obstructing the opening formed by the combination of the first plate with the notch of the side bar when in all positions but one, and coacting openings formed in the latch plate and flange for the reception of a seal wire.

6. In a coop, side bars, one of which is notched, a slidable slat having one end mounted in the other of the side bars and held against longitudinal movement in one direction, a plate bridging the notch of the first named side bar and provided with a flange, and a latch pivoted to the flange and preventing movement of the slat in the opposite direction comprising a plate of greater width and length than the opening formed by the combination of the first plate with the notch of the side bar and having the pivot engaged therewith at a point spaced from the upper edge thereof a distance approximately equal to the distance between the pivot and the adjacent edge of said opening.

In testimony whereof I hereunto affix my signature.

FRANK P. BROOKS.